3,005,801
Patented Oct. 24, 1961

3,005,801
METHOD OF POLYMERIZING
Wallace A. Erickson, Chicago, Ill., and John A. Cornell, Berwyn, Pa., assignors to H. D. Justi & Son, Inc., Philadelphia, Pa., a corporation of Pennsylvania
No Drawing. Filed Nov. 21, 1958, Ser. No. 775,342
17 Claims. (Cl. 260—78.4)

This application is a continuation-in-part of our copending application Serial Number 635,975 filed January 24, 1957, now U.S. Patent 2,985,626 and relates to a method of producing aromatic, solvent-soluble methacrylate ester solid polymers of uniform particle size in the range of about 2-20 microns, said polymers being characterized by low molecular weight, i.e., molecular weights from about 30,000 to 190,000, preferably about 40,000 to 110,000.

In our prior patent application there is described a water-initiated hydrogen peroxide polymerization procedure carried out in aqueous acid medium utilizing a hydrophilic carbohydrate as the sole dispersion agent to produce finely divided spherical solid methacrylate ester polymer particle of low molecular weight. In contrast with prior procedures for polymerization of methacrylate esters in which it is difficult, if not impossible, to stop chain growth in suspension or emulsion at a low molecular weight, the carbohydrate suspending agent as used in this invention permits initiation in the aqueous acid phase and allows a low molecular weight polymer in practical catalyst concentration ranges. The procedure of the invention thus avoids the use of polymerization inhibitors or chain transfer agents such as hydraquinone, propionaldehyde, sulfides, etc., which tend to contaminate the solid polymer produced.

The present invention obviates the above mentioned difficulties of controlling molecular weight and polymer purity encountered in the procedures of the prior art and achieves solid polymers of uniform low molecular weight and uniform molecular weight range possessing outstanding film-forming properties, high purity and excellent solution stability in organic solvents. Because the polymerization method of the invention is initiated in water by iron-salt-promoted hydrogen peroxide initiator there is prevented undesirable non-uniform increase in molecular weight during the polymerization cycle, thereby insuring a product of substantially constant low molecular weight and controlled molecular weight range.

The method of polymerization has been further refined in accordance with the present invention to produce a uniform size of methacrylate ester solid polymer in the range of 2-20 microns which is particularly suitable for use in plastisols, plastigels and in monomer-polymer slurry formulations as are used for casting and in dentistry.

It has been discovered that by following the details of procedure as set out in our copending application Serial Number 635,975 and by altering the range of proportions of hydrophilic carbohydrate suspending agent from a range of 0.5% to 3.0% disclosed in the parent application to a narrower ranged of from 0.2-0.9%, preferably 0.4-0.6% based upon 100 parts by weight of monomer, that a uniform particle size of finely divided solid is produced within the range of 2-20 microns. It has been further discovered that the polymerizable material may be expanded from the methyl methacrylate monomer disclosed in our copending parent patent application.

The class of monomers which are polymerized in accordance with the invention described in our copending application Serial Number 635,975 has thus been broadened from methyl methacrylate monomers to include in the present continuation-in-part application, the alkyl, aralkyl and oxygen heterocyclic methacrylate esters and the itaconate disubstituted alkyl esters. The methacrylate esters include alkyl esters of methacrylic acid containing from one to eight carbon atoms in the alkyl group, tetrahydrofurfuryl methacrylate, the ester of tetrahydropyran-2-methanol and methacrylic acid (tetrahydropyran-2-methyl methacrylate) cyclopentyl methacrylate, cyclohexyl methacrylate, phenylethyl methacrylate, benzyl methacrylate and mixtures of these methacrylate esters with each other.

The itaconate diesters include the lower alkyl itaconates having from one to eight carbon atoms in the alkyl group such as dimethyl itaconate, diethyl itaconate, methyl propyl itaconate, dibutyl itaconate, di-2-ethylhexyl itaconate, etc.; the dicycloalkyl itaconates such as dicyclopentyl itaconate, dicyclohexyl itaconate, ditetrahydrofurpentyl itaconate, ditetrahydropyran-2-methyl itaconate and furyl itaconate, aralkyl itaconates such as dibenzyl itaconate.

The itaconate diester monomers and methacrylate ester monomers may be employed in admixture with each other, e.g., one or more of methyl methacrylate, isobutyl methacrylate and/or ethyl methacrylate may be premixed with dimethyl itaconate as the liquid monomer for polymerization to form finely divided solid polymer particles greater than 2 microns and less than 20 microns in diameter in accordance with the invention.

As long as at least about 60% by weight of the liquid polymerizable monomer material is either methacrylate ester or itaconate diester or a mixture consisting of methacrylate ester and itaconate diester, other polymerizable monomers may be added in limited amounts to modify the properties of the polymer, the resulting modification in properties being known in the prior art. Up to 40% of vinyl aromatic monomers such as styrene, vinyl toluene, confer aromatic solvent-solubility to the product; up to 40% of acrylic acid esters of lower monohydric aliphatic alcohols having from 6 to 8 carbon atoms may be employed to provide an elasticizing action with improved adhesion to the solid polymer produced.

Products made by polymerizing liquid material containing 60% methyl methacrylate and 40% ethyl acrylate, or 30% methyl methacrylate, 30% butyl methacrylate and 40% ethyl acrylate have rubbery characteristics while retaining surface hardness, the products containing the higher proportions of methyl methacrylate being harder than the products containing the lower proportions. These products are further characterized by excellent resistance to hydrocarbon solvents after being molded, particularly in the presence of cross-linking agents such as methacrylate diesters of polyhydric alcohols, e.g., ethylene glycol dimethacrylate, diethylene glycol dimethacrylate, triethylene glycol dimethacrylate, and are particularly suitable for sintering in the form of powders or in the form of plastisols to form hydrocarbon solvent-resistant open-pore filters by the procedure shown in Berg U.S. Patent 2,371,868 or Bauer U. S. Patent 2,160,-054. These elastic products are also suitable to form flexible acrylic foams of the closed cell type by known procedures, e.g., by whipping as shown in U.S. Patent to Cunradi No. 2,211,429 or by empolying commercially available blowing agents such as are described in U.S. Patent to Cooper No. 2,447,055. These acrylic foams illustrated with the more flexible products and the more rigid products above mentioned are suitable as insulation and structural padding.

Up to 10% of methacrylic acid, itaconic acid or acrylic acid may be mixed with the methacrylate ester and/or itaconatic diester monomers of the invention without modifying the surface characteristics of the solid polymer produced to cause it to swell in the acid medium. Similarly, up to 10% and preferably up to 5% of acrylamide or methacrylamide may be added to the methacrylate ester and/or itaconate diester monomers. Up to 10% of acrylonitrile or fumaronitrile may be added to the methacrylate ester and/or itaconate diester monomers. Where acrylonitrile or fumaronitrile is added, it is desirable to also add a vinyl aromatic monomer such as styrene or vinyl toluene: a flexibilizing acrylate ester, e.g., methyl acrylate and an acid monomer such as acrylic acid or methacrylic acid to produce solid polymer products exhibiting good aromatic solvent-solubility and good adhesion without excessive embrittlement. Where acrylamide or methyl acrylamide are used in admixture with the methacrylate ester and/or itaconate diester, either acrylic acid or methacrylic acid is left out of the monomer mixture. A combination of the acrylamide and acrylic acid monomers appears to prevent the attainment of particle sizes between 2–20 microns.

The methacrylate ester and itaconate ester monomers contain one unsaturated double bond in the $\alpha$, $\beta$ position to the carboxyl group and are further characterized by a terminal $\beta$ methylene group. These esters which are polymerized to low molecular weight solid polymers in accordance with the invention are represented by the formula

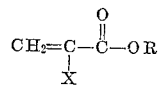

wherein X is a radical of the group consisting of

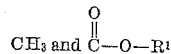

and where R and $R^1$ are each a radical selected from the group consisting of alkyl, cycloalkyl, aralkyl, tetrahydrofurfuryl and tetrahydropyran-2-methyl.

In order to prepare solid methacrylate ester or itaconate ester polymers of uniform molecular weight range and of low molecular weight, the method of the invention requires the utilization of an inorganic peroxide and an iron promoter in an aqueous acid medium to provide the polymerization free radical generating catalyst at polymerizing temperatures above about 70° C. the liquid monomer being suspended in the form of pearls which are protected by a hydrophilic carbohydrate as the sole dispersing agent in the aqueous acid medium, and the total amount of peroxide employed being not less than about 0.5% of peroxide per 100 grams of liquid monomer initiated for polymerization by the iron-salt-promoted hydrogen peroxide catalyst.

By initiation of polymerization with this specified minimum concentration of hydrogen peroxide, polymer growth is limited to precipitate solid polymer from the acid medium having a low molecular weight value. The narrow range of molecular weight is achieved in accordance with the invention by adding hydrogen peroxide catalyst at a substantially uniform rate to maintain the minimum concentration of at least .001% by weight as hydrogen peroxide in said aqueous acid medium and less than a maximum concentration of 0.05% by weight of said hydrogen peroxide catalyst during the entire polymerization cycle, varying from about 20 to 90 minutes and preferred by from about 40 to 75 minutes.

A high peroxide catalyst activity in the aqueous phase permits polymerization to be carried out rapidly. This high catalyst activity, necessary to achieve low molecular weight, is attained by controlling within narrow limits the minimum and maximum amounts of hydrogen peroxide catalyst present in the hot aqueous acid medium and also by controlling the molar ratio of water-soluble iron salt promoter to water-soluble peroxide catalyst in the aqueous acid polymerization medium.

In the absence of water-soluble iron salt promoter for the water-soluble peroxide catalyst, the initiating activity of the peroxide catalyst is reduced even when the temperatures may be raised to above 100° C. under super-atmospheric pressure and the uniformly narrow range of low molecular weight solid polymer is not obtained.

The amount of water-soluble iron salt promoter which is employed is based upon the total amount of water-soluble peroxide catalyst used to initiate polymerization in the aqueous phase and it has been determined that the molar ratio of iron salt to peroxide expressed as hydrogen peroxide must lie between about 1/300 to about 1/50 and that a total amount of water-soluble peroxide catalyst must be employed which is at least about 0.5% by weight of the monomer and not more than about 3.5% by weight of the monomer, a preferred ratio lying between 1.5% and 3.5% by weight of the monomer.

If amounts smaller than 0.5% by weight of water soluble peroxide are employed then the molecular weight range is too high and the desired shorter polymerization cycle which varies between about 15 minutes to about 90 minutes does not provide a low value and a narrow range of molecular weight of solid polymer. The use of smaller amounts than 0.5% of said peroxide and carrying out the polymerization for longer time periods serves to increase both the range of molecular weight and provides undesirable higher molecular weight fractions.

By employing more than about 3.5% of water-soluble peroxide, there is a tendency toward oxidative reactions between the peroxide with monomer and prepolymer fragments. These reactions introduce impurities during polymerization and these impurities cause foaming, particularly under the highly activated conditions which are achieved by the use of the specified quantities of iron salt promoter.

If the addition of catalyst is not carried out at a uniform rate such as to maintain minimum quantities of at least 0.001% by weight as hydrogen peroxide in the water medium and not more than the maximum of 0.02% by weight of said peroxide in said water medium, the polymerization cycle becomes one which combines non-uniform polymerizing operations in series, e.g., a slower addition produces a partial cycle to form higher molecular weight products, while the slow addition followed by a faster addition of catalyst produces products of lower molecular weight to produce mixtures of higher molecular weight solid fragments and lower molecular weight solid fragments. These mixtures are not desirable and non-uniform addition is to be avoided.

The uniform rate of addition of hydrogen peroxide catalyst provides an average hydrogen peroxide concentration lying between the stated minimum of 0.001% hydrogen perovide and maximum limit of 0.02% and is one which is preferably carried out at a level between 0.005%–0.01% hydrogen peroxide with the rate of addition being such as to maintain this level constant.

In combination with the two foregoing features of maintaining the concentration of peroxide between the above mentioned maximum and minimum limits and maintaining the ratio of iron-promoter to peroxide between the above mentioned molar ratios, there is also required in accordance with the invention, the utilization of a critical amount of hydrophilic carbohydrate suspending colloid, this hydrophilic colloid being preferably removed by hydrolysis after the solid polymer is precipitated. The removal of the colloid is accomplished either with hydrolyzing mineral acids or with enzymes to provide a solid polymer which is completely free from surface-active impurities.

The amount of hydrophilic carbohydrate suspending colloid which is employed is sufficient to provide a concentration of said colloid in the aqueous acid medium of not less than about 0.2% and not more than about 0.9% by weight of the aqueous acid medium. This amount of carbohydrate colloid represents about one-third to about one-sixth the amount of colloid which is utilized in conventional suspension polymerization as the protective coating maintaining the monomer droplets in suspension under agitation.

It has been discovered that when larger amounts of starch than 0.9% are employed the particle size of the precipitated polymer is not uniform within a spread of about 2 microns and within the range of about 2 to 20 microns in diameter. Instead there is produced very fine particles less than 1 micron in diameter along with a small amount of larger particle sizes. On the other hand, if the concentration of the carbohydrate stabilizer is less than 0.2% by weight of the aqueous water medium, there is insufficient carbohydrate colloid to provide a uniform size distribution of monomer beads and agglomeration of the batch may take place.

Accordingly, the preferred concentration of the carbohydrate suspending agent for the suspension of monomer droplets lies between 0.2–0.5% of the acid aqueous medium and produces liquid droplets of about 1 to 2 millimeters in diameter suspended in the aqueous solution prior to the preferred incremental addition of the hydrogen peroxide.

In the conventional suspension polymerization method, the rate of agitation is a critical factor, since it is essentially the sole means of producing the monomer droplets (the protective colloid only helps to maintain the droplet once it is formed) whereas this criticality is not present in the invention. The stirrer speed varies widely between 2 r.p.s. and 300 r.p.s. to provide satisfactory monomer droplets.

Carbohydrate colloids soluble in the aqueous acid phase and which are removable by acid or by enzymatic hydrolysis are necessary in order to achieve high purity in the polymer product. The soluble carbohydrate colloids which may be employed include high molecular weight hydrophilic carbohydrate materials such as soluble starch, gum tragacanth, gum acacia, water-soluble glycol cellulose, sodium alginate, and agar agar, which all remain in the aqueous acid medium after polymerization is completed. There may also be used modified starches such as the starch ethers either partially or fully etherified, preferably the lower alkyl aliphatic ether starches such as methyl starch, ethyl starch, propyl starch and the like with equally good results.

Those skilled in the art will appreciate the fact that the enumerated hydrophilic carbohydrate suspending agents all do not have equal dispersing powers, e.g., gum tragacanth is less effective than soluble starch and various types of soluble starches vary in accord with the past history of the starch. When changing from one carbohydrate colloid to another, a greater or less amount thereof must, therefore, be employed to provide an effectiveness of the substituting colloid in a ratio equivalent to the soluble starch which is preferred.

At the end of the polymerization, the hydrophilic carbohydrate protective colloid occluded to the polymer particles is removed by hydrolyzing the same and the hydrolyzed products are removed by washing with water or by dissolving the polymer in an organic solvent in which the carbohydrate or starch is insoluble and filtering the same to remove the carbohydrate.

The preferred hydrolysis of the carbohydrate for purification is effected by treating the polymeric compounds with an enzymatic hydrolyzing agent at a pH of between 4 and 6 to convert the carbohydrate to water-soluble glucose or other water-soluble hydrolyzed products. It is preferred to employ as enzymes the vegetable and animal amylases. Specific types of hydrolyzing agents of this nature, which are particularly well adapted for use include, for example, pancreatin, amylopsin, pancreatic amylase, malt amylase, Takadiastase, salivary amylase, leucocyte amylase, barley amylase, potato amylase, etc.

The methacrylate and itaconate ester polymers are characterized by being uniform spheres which have by a uniform molecular weight range of about 5,000 to about 20,000 spread, average molecular weight range of about 40,000 to about 110,000 and uniform particle size of about 2 to 20 microns which render them particularly suitable for plastisol and polymer-monomer slurry applications. After they are purified to remove occluded carbohydrate, they are completely free of surface-active occluded impurities.

A preferred particle size in the range of 6 to 10 microns with a particle size variation of about 1 to 2 microns is achieved in accordance with the invention by controlling the peroxide and promotor concentrations as specified hereinabove and by employing the hydrophilic carbohydrate colloid within the limited values of concentration in the aqueous acid polymerization medium. Smaller values of particle size approaching 2 micron diameters are produced if the amount of carbohydrate suspending, preferably starch, is increased to higher values. Still larger size of particle towards 20 microns are attained as the concentration of carbohydrate colloid decreases toward a limit of 0.2%.

A comparison of the amount of carbohydrate, e.g., starch colloid utilized in accordance with the aqueous initiation procedure for polymerization of the present invention with conventional suspension polymerization employing pectin, starch, gelatin or polyvinyl alcohol colloid stabilizers indicates that the concentration preferred in accordance with the invention is less, i.e., about one-third to about one-eighth of the amount of starch usually employed for conventional suspension polymerization and that in contrast with suspension polymerization wherein such colloids as polyvinyl alcohol, pectin, gelatin and starch are usually deemed equivalent, the instant procedure for providing uniform particle sizes has been found to be operable only when a carbohydrate suspending agent such as starch is employed.

This latter differentiation of the colloidal protective action for the carbohydrate colloid which has been discovered to provide uniform particle size in the range of 2 to 20 microns is believed to be unique in view of recognized factors controlling dispersion stabilizer efficiency. It is known, for example, that polyvinyl alcohol in extremely low concentration, i.e., about 0.005% is very effective to provide uniform liquid pearls in suspension polymerization having sphere diameters between about 1.3 and 0.3 millimeters. This same concentration of starch is wholly ineffective to produce these pearls in suspension. The dispersion stabilizer efficiency is highest for polyvinyl alcohol and quite low for starch or other carbohydrate colloids and is based upon the minimum amount of the colloidal agent to give uniform small beads and to hinder agglomeration of these liquid beads. With 80% hydrolyzed polyvinyl acetate of relatively high viscosity greater emulsifying activity is achieved than with starch. However, using polyvinyl alcohol the resulting polymer is in a sub-micronic particle size and is used for a different purpose, e.g., to prepare storage stable suspensions by addition of anionic surface-active agents.

In contrast, the use of a far less efficient stabilizing system, i.e., a low efficiency starch suspending agent at a lower range of proportions than would be expected to be effective, provides a particle size range between about 2 to 20 microns which is far lower than that produced by conventional suspension polymerization methods which produce beads or pearls varying from 50 to 150 microns.

It has further been determined that the employment of anionic surface-active agents with starch, i.e., agents such as sodium oleate will not provide the particle size of 2-20 microns and unformity therein as in the present invention.

The particle size range produced in accordance with the invention is to be contrasted with a particle size range of between about 0.01 to about 0.4 micron which is achieved by conventional emulsion polymerization procedures.

The particle size range for suspension polymerization starting at 50 microns and the particle size range for emulsion polymerization ending at about 0.5 micron are thus seen to bracket on opposite sides of the scale, the particle size range of 2 to 20 microns achieved in accordance with the invention. The advantage of producing, by a simplified unitary and rapid polymerization procedure, uniform particles within this commercially new range is believed to be obvious. The further advantage of achieving low molecular weight without resorting to chain stopping agents, such as dodecyl mercaptan, which introduce impurities in the product is also believed to be apparent. Since a feature of the invention is to eliminate traces of the carbohydrate suspending agent either by chemical or enzymatic hydrolysis and thereby eliminate last traces of occluded surface-active agents completely from the precipitated polymer, the invention produces polymer in a purity which is far in excess of that which can be obtained by conventional emulsion polymerization.

The three essential ingredients, protective colloid, inorganic peroxide and iron promoter are present in acid solution. Any water-soluble acid of sufficient strength to render the aqueous reaction mixture definitely acidic may be used as the acid ingredient. Examples of such acids are nitric acid, hydrochloric acid, sulphuric acid, benzene sulphonic acid, acetic acid, chloroacetic acid, etc. The acid is employed in an amount sufficient to reduce the pH value of the reaction mixture to below 6 and preferably between 1.5 and 3. Best results are usually obtained when employing hydrochloric acid in the proportions just stated as the acid ingredient of the catalyst.

The heat of reaction during polymerization above 70° C. is dissipated smoothly and rapidly in the aqueous phase as soon as the initial reaction temperature range of 75°–85° C. is reached without encountering strong exothermic surge in temperature as experienced with conventional suspension polymerization. Polymer in solid form starts to form within a few minutes and temperature control is relatively easy to maintain.

Any inorganic peroxide soluble in the acid phase to generate hydrogen peroxide may be used as a catalyst ingredient, but hydrogen peroxide is preferred. Other peroxide compounds which may be employed are metal peroxides such as sodium or barium peroxide which may be reacted with the acid to form hydrogen peroxide in situ, etc. Between 0.010 and 0.09 mol of peroxide is usually employed per 100 grams of methacrylate ester compound or itaconate diester compound to be polymerized.

Although iron salts which are in the ferrous state are preferred for use as the promoter, iron salts may be also used in which the iron is in the ferric state. All or part of the water-soluble iron salt may be in the ferrous state.

It is preferred that the iron salt activator in water solution be prepared from any of the readily available soluble iron salts including the inorganic iron salts such as ferrous sulphate, ferric sulphate, ferrous nitrate, ferric nitrate, ferric chloride and the organic salts such as ferric lactophosphate, ferrous disodium salt of ethylene diamine tetra-acetic acid, ferrous citrate, ferrous gluconate, ferrous tartrate, etc. The preferred inorganic ferrous salt is ferrous sulphate. The preferred organic ferrous salt is one in which the metal compont, ferrous iron, is chelated with ethylene diamine tetraacetic acid and the more water soluble forms of the chelated iron compounds appear to give the best results.

As indicated, the initial concentration of hydrogen peroxide catalyst lies below a maximum of about 0.02% by weight of the aqueous acid solution and above a minimum of 0.001% by weight of the acid medium expressed as hydrogen peroxide. The molar ratio of iron salt to hydrogen peroxide must lie between about 1/300 to about 1/50. The activated hydrogen peroxide substantially instantaneously initiates polymerization in the water phase under the specified temperature conditions, e.g., above 75° C. Solid polymerized methacrylate ester or itaconate ester in finely divided form precipitates directly after the catalyst addition and the solid has a uniformly large particle size in the range of about 2 to about 20 microns in diameter.

The invention produces low molecular weight, and a narrow range of molecular weight values of precipitated polymer by reproducible and uniform rapid polymerization procedures requiring from about 20 to about 90 minutes and preferably from about 40 to about 75 minutes. In contrast, the molecular weights achieved by unmodified suspension polymerization are generally higher by from about 150,000 to about 500,000 units for the same species of methacrylate ester polymers employed in the present invention whether these are produced by conventional suspension polymerization methods or by conventional emulsion polymerization methods without chain transfer agents which cause impurities and decrease thermal and ageing stability.

This distinctive difference is believed to be due to the unique initiating action and chain terminating action which is provided by the iron-promoted inorganic peroxide catalyst system in the aqueous acid medium at polymerizing temperatures above about 70° C. acting on particles protected by a carbohydrate suspending agent.

Other redox catalysts have been tried but have been found to be ineffective for the simultaneous production of low molecular weight and particle size in the range of 2 to 20 microns in the aqueous initiated precipitation polymerization of the present invention. In this connection, the iron salt which is employed as an activator or promoter for the hydrogen peroxide catalyst have been utilized in reduction-activated polymerization to permit lower temperatures for achieving rapid polymerization rates. Temperatures from about 30° C. to about 50° C. are suggested in redox emulsion polymerizations. At these lower temperatures, the low molecular weight polymers in accordance with the invention are not produced; in fact, the molecular weights generally increase to values as high as 1,000,000 to 2,000,000 for the methacrylate species of the present invention. Using other redox promoters such as potassium ferricyanide causes the molecular weight to rise to values of 1,000,000 or higher. Using ammonium persulfate free radical generating catalyst instead of inorganic peroxide also causes the molecular weight to rise above about 150,000 and particularly if persulfate is activated with sodium metabisulfite or similar reducing activators, the particle size becomes extremely fine, e.g., below 1 micron in diameter so as to be wholly unsuitable for the objective of the present invention.

The substitution of metal salts other than iron salts such as cuprous chloride in the hydrogen peroxide system does not permit the achievement of low molecular weight ranges which result from the present unique catalyst system.

In contrast to conventional emulsion polymerization utilizing highly active redox catalysts such as persulfate-ferricyanide and cuprous chloride activated peroxide and bisulfite activated persulfate catalyst, the initiation of polymerization by the present invention does not require removal of oxygen from the polymerization medium in order to immediately induce initiation. During the first stages of incremental addition of catalyst, precipitation of polymer in uniform particle size range takes place and this occurs whether the monomer is all charged at the start or in the case where monomer is charged incrementally with the catalyst throughout the polymerization cycle of from 20 to 90 minutes in both types of addition, there is an easily controlled gradual exotherm and the usually observed temperature surge is not encountered. This gradual exotherm sufficient to maintain the reaction temperature at 75° C. to 95° C. and contributes to uniformity of molecular weight and the narrow range of molecular weight values characterizing the precipitated polymers of the invention.

The methacrylate esters which may be polymerized by the present invention include solid polymers of methyl methacrylate, ethyl methacrylate, isobutyl methacrylate, butyl methacrylate, tetrahydrofurfuryl methacrylate, cyclopentyl methacrylate, in which these methacrylate esters are present in an amount of at least 60% by weight of the polymer, the remaining component of the polymer being one or more of methacrylic acid, acrylonitrile, styrene, vinyl toluene, methacrylamide, or a lower acrylate having one to four carbon atoms in the alcohol of the ester thereof, i.e., methyl acrylate through butyl acrylate.

When the polymer of the methacrylate ester is a copolymer with methacrylic or acrylic acid, the amount of methacrylic or acrylic acid is limited to not more than about 10% by weight of the copolymer and preferred polymers contain said acid in amounts of from 1% to about 5% by weight, this amount of acid being insufficient to change the surface characteristics of the precipitated solid polmer so as to cause water absorption by the polymer which is precipitated in an acid solution.

Similarly, methacrylamide and acrylonitrile are employed in amounts of less than about 10% and preferably in amounts of from about 1% to 5% by weight of the polymer in order to prevent the precipitated polymer from absorbing water and thereby rendering it difficult to filter. In addition at higher concentration than 10% the character of polymerization may change to give a solvent phase polymerization in the water.

Polymerization which is initiated in the acid phase appears to occur at sites outside of the liquid droplets protected by the surrounding film of hydrophilic carbohydrate suspending agent such as starch which is the sole suspending agent employed. The droplets serve as a reservoir for the liquid monomer. This reservoir is insulated from the aqueous acid solution by the surrounding starch film uncontaminated by surface-active agents. Monomer is dissolved outside of the liquid pearl reservoir in an amount depending upon its solubility, generally in a quantity of less than 2% by weight of the aqueous phase. The colloid thus serves as a monomer-releasing barrier permitting exit of monomer in amounts controlled by its solubility in the aqueous acid phase. Monomer which is depleted from the pearl is replenished by feeding additional monomer to the water and in the continuous operation which is contemplated by the present invention, the precipitated polymer is separated and incremental feeding of fresh monomer together with incremental feeding of catalyst are effected in accordance with the specific procedure set forth hereinabove.

In contrast to the size of the monomer droplets of 1 to 2 millimeters in diameter, the particle size of 2 to 20 microns represents a reduction in size distinctively different from that in suspension polymerization and this reduction is from one-tenth to one-hundredth that of the liquid pearls.

Where monomers are employed which have lower solubilities than in the case of methyl methacrylate, the addition of small amounts of water-miscible alcohol serves to increase the concentration of monomer from about ½% to 2% in the aqueous phase. For example, by adding about 10 to 50 cubic centimeters of methanol or ethanol to the aqueous medium having a volume of about 900 cubic centimeters, the concentration of monomer for initiation in the aqueous phase is desirably increased and this procedure is preferred with monomers displaying a lower water-solubility than methyl methacrylate, e.g., isobutyl methacrylate, cyclopentyl methacrylate, cyclohexyl methacrylate, etc.

To a lesser extent, the addition of small proportions of methacrylic acid appears to increase slightly the water-solubility of the methacrylate monomer. In those cases where the methacrylate is of the lower solubility type in water, e.g., isobutyl methacrylate, copolymerization with 5% of acrylic or methacrylic acid appears to enhance the concentration of the less soluble methacrylate component in the aqueous phase.

Certain methyl methacrylate polymers of the present invention form particularly desirable products for coating and adhesive application and these methyl methacrylate polymers include methyl methacrylate/methacrylic acid polymers having weight percent proportions between 99/1 and 95/5, methyl methacrylate polymers with N-butyl acrylate or ethyl acrylate or isobutyl acrylate and methacrylic or acrylic acid, the higher acrylates being present in amounts up to 20% and the acid being present in amounts up to 5%, and methyl methacrylate terpolymers with styrene, acrylonitrile and acrylic or methacrylic acid, the styrene being present in amounts of from 10% to 20%, acrylonitrile being present in amounts of from 10% to 20%, and the acrylic or methacrylic acid being present in amounts of from 2 to 5%.

Homopolymers of methacrylates such as methyl methacrylate, isobutyl methacrylate and ethyl methacrylate may be modified with small amounts of crosslinking agents to provide reactive sites and thereby produce molding compositions having improved impact strength. Here, suitable crosslinking agents such as allyl methacrylate or glycidyl methacrylate are added to the monomer in weight ratios of 1 to 1,000 parts of monomer.

The low molecular weight polymers of the invention are to be compared with high molecular weight polymers such as methyl methacrylate prepared by conventional methods. These conventional polymers usually have a molecular weight of several hundred thousand up to about 1,500,000 and due to high molecular weight are only sparingly soluble in aromatic solvents. These polymers only dissolve in the most active organic solvents such as ketones. Due to this insolubility in aromatic solvents and due to their inherent brittleness, the conventionally prepared polymers are unsuitable as coating materials which are desirably applied from aromatic solvent solutions particularly by spraying. Due to the requirement for active ketone solvents, organic solutions of these polymers have been expensive and difficult because the active solvents tends to lift the primer. Appropriate priming to obviate lifting has been dffiicult to achieve and the desired finishes on metal have not been obtained because the high molecular weight polymer has, per se, poor film-forming characteristics. It has been necessary to utilize modifiers for the resinous methyl methacrylate which detract from the excellent light stability and hardness of the polymer.

In contrast to the acrylic polymers for coating application which have been utilized commercially, certain of the methyl methacrylate and copolymers of methyl and ethyl methacrylate of the present invention, particularly those of low molecular weight which are copolymerized with acids such as acrylic acid or methacrylic acid or itaconic acid in amounts up to 5% and which have been modified with between about 0.1% and 0.001% of cross-linking agents such as glycidyl methacrylate or allyl methacrylate, combine desirable properties of solubility in inexpensive aromatic solvent, excellent compatibility with modifying resins such as urea-formaldehyde and melamine-formaldehyde resins and these polymers can be employed as baking finishes for metal, particularly for automobiles, to provide advantages which have not heretofore been obtainable.

By combination of these low molecular weight solid methacrylate polymers with derivatives of cellulose, such as nitrocellulose, cellulose carboxylates or ethyl cellulose, or with other suitable resins, butyl alcohol solutions of alkyd resins, solvent-soluble urea-formaldehyde resins and methylol melamine resins in butyl alcohol, highly elastic films of good adhesion, high gloss and good compatibility can be obtained which are resistant to repeated bending. Films of the low molecular weight polymerized higher methacrylate esters, e.g., butyl methacrylate and ethyl methacrylate, may be employed, per se, as an adhesive in the production of safety glass, as a coating on leather or fabrics, or as oil additives.

Particularly suitable as inexpensive solvents for the polymer used for coating applications are mononuclear aromatic hydrocarbon solvents such as benzene, toluene and xylene. Any of the isomeric xylenes can be used although commercial mixtures of the various xylenes are preferred, these being less expensive. In the mononuclear alkyl-substituted aromatic hydrocarbon solvent or mixtures thereof which can be used, lower alkyl substituents are preferred. Thus, mono-, di- and tri-substituted benzene may be employed and suitable solvents include ethyl benzene and mesitylene. Propyl and butyl substituted benzenes may also be used.

To these aromatic solvents, limited quantities of up to about 10% of aliphatic hydrocarbon solvents may be added without causing the dissolved solid polymer to precipitate. Remarkably low viscosities at high solids are achieved. About 40% resin solids in benzene, toluene or xylene at room temperature forms a liquid clear solution admirably adapted for coating and which can be used at this level or cut down to any lower value by dilution with more solvent as desired. More active solvents such as acetone, isophorone, etc. may also be added in small amounts, e.g., 2% to 8% of the solvent medium.

We shall now illustrate by way of example several methods of conducting our process, but with the understanding that our invention shall not be restricted to the details therein given except as it may be limited by the claims appended hereto.

Example I

This example illustrates the incremental addition of the activated redox catalyst in forming (solid) methyl methacrylate polymers.

A standard two-liter resin flask was employed as the reaction vessel. The kettle was jacketed in such a fashion that the jacket could be removed and the kettle cooled in a water bath to moderate the reaction. Agitation in the form of a two-blade stirrer at 100 r.p.m. was employed.

The flask was charged with 900 cubic centimeters of distilled water, 6 grams of starch, 0.9 gram of concentrated hydrochloric acid and the mixture was brought to a boil and cooled to 75° C. To the mixture there were added 300 milliliters of distilled methyl methacrylate and this was followed with 0.145 gram of $FeSO_4 \cdot 7H_2O$ in a small amount of water.

The peroxide catalyst used was 20 grams of 30% hydrogen peroxide and to this was added distilled water which was made up to 100 milliliters of solution. One quarter of the peroxide catalyst was added to start the reaction. Then the remainder of the catalyst was dripped into the reaction vessel. The amount added was distributed uniformly over a fifteen minute period starting five minutes after the initial addition. The temperature was raised immediately to 85° C. and the polymerization was controlled by applying cooling to maintain the 85° C. temperature.

After polymerization was completed, total time of 50 minutes, the mixture was cooled and neutralized. Enzymes consisting of pancreatin amylase and barley amylase in equal parts were added to break down the starch occluded to the solid polymer. The amount of enzyme added was 0.1 gram. After standing 16 hours, the suspension was filtered and washed with distilled water. The separated finely divided solid polymer was dried in an oven at 50° C. The yield of finely divided solid polymer was 90%. The molecular weight of the product was about 80,000 determined from viscosity data. The solubility of the product in toluene was 45% by weight, to give a slightly yellowish solution with a few scattered specks, otherwise a clear, slightly viscous solution.

Example II

The same procedure was followed as in Example I except that the temperature was maintained at 90° C. and the total addition time was 45 minutes. Uniform low molecular weight solid polymer was produced in a yield of about 85%. The molecular weight was 60,000. The solubility in xylene was 47% by weight.

Example III

The same procedure was followed as in Example I except that 75% of the redox catalyst was added at the start and 25% was added after 15 minutes of reaction at 85° C. The same results were obtained as in Example I.

Example IV

The same procedure as in Example I was followed except that 0.25 gram of ferrous sulfate heptahydrate was employed instead of 0.145 gram and at a reaction temperature of 85–90° C. for a total time of reaction of 50 minutes. A good yield of xylene-soluble solid polymer, molecular weight 70,000, was obtained.

Example V

The same procedure as in Example I was followed except that the amount of peroxide catalyst was cut from 20 grams of 30% hydrogen peroxide to 5 grams of 30% hydrogen peroxide. An equally good solid polymer was obtained as in Example I.

Example VI

The same procedure as in Example I was followed except that the monomer was not distilled before use and 0.006% hydroquinone inhibitor was left in the monomer. No indication of inhibition was obtained as in Example I and an equally good yield of solid polymer was had having identical solubility, purity and molecular weight values.

Example VII

The same procedure as in Example I was followed except that the promoter used was 0.260 gram of ferric sulphate instead of ferrous sulphate. Polymerization time was about the same and an equally good solid polymer was obtained as in Example I.

Example VIII

The same procedure as in Example I was followed except that the amount of peroxide catalyst was cut from 20 grams of 30% hydrogen peroxide to 5 grams of 30% hydrogen peroxide and the peroxide was added at once. A polymer was obtained with a much higher fraction insoluble in aromatic solvents but with an average molecular weight of 95,000.

Example IX

A series of polymerization was carried out in a standard five-liter flask fitted with a two blade stirrer rotating at 100 r.p.m., the flask being jacketed for heating on a water bath and for cooling to moderate the reaction. A standard charge was employed, the flask being charged with 2,500 milliliters of water, 9 grams of soluble starch and 1 gram of concentrated hydrochloric acid (32% HCl). The mixture was brought to a boil, cooled to 75° C., and monomer added in an amount of 900 grams. Iron promoter and peroxide catalyst were added. 0.62 gram of ferrous ammonium sulfate as catalyst was added, this being dissolved in a small amount of water. Peroxide was added in the form of a 30% solution diluted to 250 milliliters with water, the amount of peroxide being expressed in terms of the number of milliliters of 30% aqueous hydrogen peroxide contained in the 250 milliliters representing the total amount added. The addition was made continuously at a uniform rate in 25 milliliter aliquot portions during 5 minute intervals unless otherwise specified.

Table I hereinbelow tabulates the results.

TABLE I

| Run No. | Percent of MMA and MA[1] | Amount of hydrogen peroxide (cc. of 30% H₂O₂), I.P. | Time of addition (minutes) | Temperature (° C.) | Molecular weight | Average particle size in microns |
|---|---|---|---|---|---|---|
| 167 | 95-5 | 75 (0.6 g. I.P.) | 50 | 80-85 | 55,000 | 4 |
| 204 | 96-4 | 64 (0.6 g. I.P.) | 50 | 80-82 | 40,000 | 4 |
| 201 | 96-4 | ___do___ | 60 | 80-84 | 55,000 | 4 |
| 199 | 96-4 | 75 (0.6 g. I.P.) | 65 | 80-86 | 50,000 | 4 |
| 198 | 96-4 | 35 (0.6 g. I.P.) | 65 | 80-86 | 75,000 | 4 |
| 197 | 96-4 | 30 (0.6 g. I.P.) | 75 | 80-83 | 95,000 | 6 |
| 188 | 96-4 | 75 (0.6 g. I.P.) | 60 | 81-86 | 60,000 | 6 |
| 174 | 97-3 | 75 (0.05 g. of iron promoter) | 60 | 80-84 | 60,000 | 4 |
| 173 | 97-3 | 75 (0.2 g. of iron promoter)[2] | 64 | 80-85 | 60,000 | 4 |
| 176 | 97-3 | 75 (0.4 g. of iron promoter)[2] | 54 | 80-84 | 60,000 | 4 |
| 175 | 97-3 | 75 (0.5 g. of iron promoter)[2] | 55 | 80-85 | 60,000 | 4 |
| 172 | 97-3 | 25 (0.6 g. of iron promoter)[2] | 68 | 80-85 | 105,000 | 5 |
| 191 | 97-3 | 30 (0.6 g. I.P.) | 60 | 80-84 | 80,000 | 5 |
| 190 | 97-3 | 40 (0.6 g. I.P.) | 60 | 80-84 | 70,000 | 5 |
| 189 | 97-3 | 75 (0.6 g. I.P.) | 50 | 80-83 | 55,000 | 5 |
| 181 | 97-3 | ___do___ | 60 | 80-84 | 55,000 | 5 |
| 178 | 97-3 | ___do___ | 61 | 82-88 | 60,000 | 5 |
| 171 | 97-3 | ___do___ | 35 / 25 | 80-82 / 90 | 55,000 | 5 |
| 170 | 97-3 | 150 (0.6 g. I.P.) | 43 | 80-82 | 60,000 | 5 |
| 194 | 98-2 | 75 (0.6 g. I.P.) | 60 | 80-88 | 50,000 | 6 |
| 164 | 100-0 | ___do___ | 30 | 75-81 | 75,000 | 6 |
| 169 | 100-0 | 150 (0.6 g. I.P.) | 50 | 76-84 | 60,000 | 6 |

[1] MMA—methyl methacrylate; MA—methacrylic acid.
[2] I.P.—Iron Promoter = Ferrous ammonium sulphate $(NH_4)_2SO_4$—$FeSO_4$—$6H_2O$.

Run numbers 173, 174, 175 and 176 in Table I illustrate the effect of variations in the amount of iron salt promoter (ferrous ammonium sulphate hexahydrate $$(NH_4)_2SO_4\text{—}FeSO_4\text{—}6H_2O$$

which is employed, keeping the amount of hydrogen peroxide catalyst which is incrementally added at a constant value of 75 cubic centimeters of 30% hydrogen peroxide. As seen in these runs, the molecular weight remains at a constant value of 60,000 and the molecular weight spread varies between 5,000 and 10,000 units, thus demonstrating that catalyst activity in these preferred runs is maintained even though the amount of iron promoter for the catalyst employed drops from a value of 0.6 to 0.5 gram. Since larger amounts of promoter at the upper end of the permissive range in accordance with the invention tend to introduce some color due to ionized iron, smaller amounts of iron promoter, i.e., amounts less than 0.3 gram in the ratios employed in this example are preferred. In certain cases, it may be desirable to add the iron promoter portionwise during the polymerization, with one-half to two-thirds being added at the start of the polymerization cycle and the rest of the promoter being added after polymerization has proceeded approximately half-way toward completion.

While variations in the amount of iron promoter employed within the limits of the invention have no appreciable effect on molecular weight, the use of smaller amounts of peroxide tends to cause an increase in molecular weight. In comparing runs 172 and 175, decreasing the amount of peroxide from 75 cubic centimeters to 25 cubic centimeters as in run 172 causes the molecular weight to increase from 60,000 to 105,000 under the same polymerization conditions.

In run number 170, an increase from 75 cubic centimeters of hydrogen peroxide to 150 cubic centimeters of hydrogen peroxide results in the achievement of about the same molecular weight so that the additional amount of peroxide which is employed constitutes an excess beyond that which is needed.

As mentioned in the main body of the description, the use of additional quantities of hydrogen peroxide permits the polymerization cycle to be reduced appreciably, i.e., a reduction in time of 5 to 20 minutes, but the use of an excess amount is not preferred since oxidative reactions and foaming take place in the reaction mixture; foaming was observed in run 170.

The effect of a more rapid rate of addition of peroxide catalyst is illustrated in runs 201 and 199. In these runs, additions occurring at shorter time intervals caused the achievement of lower molecular weights. The percentage of methacrylic acid in these runs is one of the factors determining the rate of polymerization and the achievement of molecular weight fractions lower by 15,000 units in run 204 than in run 167 illustrates this factor of acid concentration in copolymer.

The molecular weight determinations in the foregoing table were carried out as follows:

A 0.5 gram sample of the polymer was dissolved in 100 ml. of ethylene dichloride. The relative viscosity was determined in a Ostwald-Cannon-Fenske viscosimeter $$\eta \text{ rel } 25°\text{ C.} = \frac{\text{Viscosity of 0.5\% solution}}{\text{Viscosity of solvent}}$$

The molecular weight is calculated as for a homopolymer of polymethyl methacrylate as per Billmeyer et al., J. Pol. Sci. 4, 83–84 (1949) and ibid 5, 121–137 (1950).

A further measure of molecular weight is a block melting point of the polymers and Table II below illustrates variations of melting points for various illustrative polymers for which the composition and molecular weight are given.

TABLE II

| Run No. | Percent of MMA and MA[1] | Molecular weight | Melting point[2] (° C.) |
|---|---|---|---|
| 167 | 95-5 | 55,000 | 140 |
| 188 | 96-4 | 60,000 | 142 |
| 189 | 97-3 | 55,000 | 135 |
| 181 | 97-3 | 55,000 | 136 |
| 178 | 97-3 | 60,000 | 148 |
| 127 | 97-3 | 105,000 | 155 |
| 169 | 100-0 | 60,000 | 143 |
| 164 | 100-0 | 75,000 | 136 |

[1] MMA—methyl methacrylate; MA—methacrylic acid.
[2] Melting point was determined by placing the dry pure solid polymer on a clean steel hot plate preheated to a specified temperature and observing melting of the solid.

The melting point determination constitutes a valuable control procedure which may be employed in order to verify uniformity of molecular weight characteristics the products produced in accordance with the invention.

*Example X*

This example illustrates the procedure for preparation of copolymers of methacrylate esters with acrylonitrile, styrene and methacrylic acid.

In accordance with the procedure of Example IX hereinabove, a 5-liter flask fitted with stirrer and temperature moderating jacket was charged with 2,500 milliliters of water, 9 grams of soluble starch and 1 gram of concentrated hydrochloric acid (32% HCl). The mixture was brought to a boil, cooled to 75° C. and 603 grams of methyl methacrylate, 135 grams of acrylonitrile, 135 grams of styrene and 27 grams of methacrylic acid were added to the mixture. Catalyst and 0.62 grams of iron promoter were added in accordance with the procedure of Example IX and Table III hereinbelow tabulates the results.

TABLE III

[Preparation of Tetrapolymer of MMA, Styrene, Acrylonitrile and MA¹ 67/15/15/3]

| Run No. | Hydrogen peroxide cc. of 30% H₂O₂ | Time of addition (mins.) | Molecular weight |
|---|---|---|---|
| 195 | 75 | 40 | 90,000 |
| 196 | 75 | 65 | 120,000 |
| 123 | 75 | 35 | 110,000 |
| 122 | 100 | 30 | 85,000 |

¹ MMA—methyl methacrylate; MA—methacrylic acid.

As summarized in Table III hereinabove, the preparation of the tetrapolymers at low molecular weight and in uniform particle size of between 4 and 6 microns is achieved under preferred conditions by using an amount of hydrogen peroxide catalyst of 100 cubic centimeters which is larger than the average employed under the procedure of Example IX, Table I. The tetrapolymer is prepared in a shorter time interval of about 30 to 40 minutes under the preferred conditions illustrated in this example. By slowing down the rate of catalyst addition and by employing a smaller amount of peroxide, the molecular weight increases and the products are less readily soluble in aromatic solvents or plasticizer or monomeric methacrylate ester additions.

*Example XI*

This example illustrates the production of copolymers of methyl methacrylate, methacrylic acid and glycidyl methacrylate. The results of the polymerization are summarized in Table IV hereinbelow, the procedure employed being that outlined in Example IX hereinabove.

TABLE IV

| Run No. | MMA-MA-GMA Percent each¹ | Addition Time (minutes) | Amount catalyst (cc. 30% H₂O₂) | Molecular weight | Particle size (average), microns |
|---|---|---|---|---|---|
| 168 | 93-5-2 | 60 | 75 | 65,000 | 4 |
| 192 | 96-3-1 | 65 | 75 | 65,000 | 4 |
| 193 | 96.5-3-.5 | 70 | 75 | 95,000 | 6 |

¹ MMA—methyl methacrylate; MA—methacrylic acid; GMA—glycidyl methacrylate.

In Table V below are listed run numbers 228, 230, and 248 illustrating variation of molecular weight with change of promoter. In run numbers 228 and 230 an amount of 0.3 g. of ferrous ammonium sulfate promoter was used. In run number 248 0.25 g. of ferrous disodium salt of ethylene diamine tetraacetic acid was used and the latter being in the same molar concentration as the ferrous ammonium sulfate.

TABLE V

[Promoter: Ferrous Ammonium Sulfate and Disodium Ferrous Ethylene Diamine Tetraacetic Acid Salt]

| Run No. | Percent of— | | | | Hydrogen peroxide (cc. 30%) | Addition time (minutes) | Temperature (° C.) | Molecular weight |
|---|---|---|---|---|---|---|---|---|
| | MMA¹ | EMA¹ | MA¹ | GMA¹ | | | | |
| 228 | 92 | 4 | 4 | 0 | 60 | 75 | 85 | 60,000 |
| 230 | 86 | 10 | 4 | 0 | 60 | 75 | 85 | 55,000 |
| 248² | 90 | 4 | 2 | 2 | 60 | 75 | 85 | 95,000 |

¹ MMA—methyl methacrylate; EMA—ethyl methacrylate; MA—methyl acrylate; GMA—glycidyl methacrylate.
² Disodium ferrous salt of ethylene diamine tetraacetic acid promoter used in run 248.

The above polymers were produced in particle size variation of 4 to 6 microns and each of the polymers displayed a higher solubility in aromatic solvents and were employed as primers deposited from an aromatic solvent solution at a concentration of 15% solids. The primers were baked on tin plate at coating film weights of 5 milligrams per square inch at 300° F. for 10 minutes. After baking, the tin plate could be bent at 180° on a ¼″ mandrel, and the primer coating did not chip.

*Example XII*

A series of polymerizations were carried out in accordance with the procedure outlined in Example IX hereinabove to obtain polymers of isobutyl methacrylate, methyl methacrylate and methacrylic acid. The results are summarized below in Table VI.

TABLE VI

| Run No. | IMA-MMA-MA Percent of each¹ | Hydrogen peroxide (cc. 30%) | Time addition (minutes) | Temperature (° C.) | Molecular weight |
|---|---|---|---|---|---|
| 301 | 96-0-4 | 75 | 50 | 80-85 | 60,000 |
| 300 | 100-0-4 | 75 | 50 | 80-85 | 65,000 |
| 302 | 50-45-5 | 75 | 50 | 80-85 | 50,000 |
| 303 | 45-50-5 | 75 | 50 | 80-85 | 50,000 |
| 304 | 90-5-5 | 75 | 50 | 80-85 | 55,000 |
| 305 | 85-13-2 | 75 | 50 | 80-85 | 60,000 |

¹ IMA—isobutyl methacrylate; MMA—methyl methacrylate; MA—methacrylic acid.

*Example XIII*

A series of polymerizations were carried out in accordance with the procedure outlined in Example IX hereinabove to obtain polymers of n-butyl methacrylate, methyl methacrylate and methacrylic acid. The results are summarized below in Table VII.

TABLE VII

| Run No. | BMA-MMA-MA Percent of each¹ | Hydrogen peroxide (cc. 30%) | Time addition (minutes) | Temperature (° C.) | Molecular weight |
|---|---|---|---|---|---|
| 401 | 96-0-4 | 75 | 50 | 80-85 | 60,000 |
| 402 | 100-0-0 | 75 | 50 | 80-85 | 65,000 |
| 403 | 30-45-5 | 75 | 50 | 80-85 | 55,000 |
| 404 | 45-50-5 | 75 | 50 | 80-85 | 50,000 |
| 405 | 90-5-5 | 75 | 50 | 80-85 | 55,000 |
| 406 | 85-13-2 | 75 | 50 | 80-85 | 60,000 |

¹ BMA—butyl methacrylate; MMA—methyl methacrylate; MA—methacrylic acid.

*Example XIV*

A series of polymerizations were carried out in accordance with the procedure outlined in Example IX hereinabove to obtain polymers of butyl methacrylate, methyl acrylate, dimethyl itaconate and methacrylic acid, the results being summarized in Table VIII hereinbelow; and to obtain polymers of isobutyl methacrylate, methyl acrylate, dimethyl itaconate and methacrylic acid, the results being summarized in Table IX hereinbelow.

TABLE VIII

| Run No. | BMA-MAc-DMI-MA Percent of each [1] | Temperature (° C.) | Time addition (minutes) | Hydrogen peroxide (cc. 30%) | Molecular weight |
|---|---|---|---|---|---|
| 501 | 55-10-32-3 | 80-85 | 60 | 100 | 65,000 |
| 502 | 60-10-37-3 | 80-85 | 60 | 100 | 65,000 |
| 503 | 65-15-18-2 | 80-85 | 60 | 100 | 65,000 |
| 504 | 60-5-30-5 | 80-85 | 60 | 100 | 65,000 |

[1] BMA—n-butyl methacrylate; IBMA—isobutyl methacrylate; MAc—methyl acrylate; DMI—dimethyl itaconate; MA—methacrylic acid.

TABLE IX

| Run No. | IBMA-MAc-DMI-MA Percent of each [1] | Temperature (° C.) | Time addition (minutes) | Hydrogen peroxide (cc. 30%) | Molecular weight |
|---|---|---|---|---|---|
| 505 | 55-10-32-3 | 80-85 | 60 | 100 | 65,000 |
| 506 | 60-10-37-3 | 80-85 | 60 | 100 | 65,000 |
| 507 | 65-15-18-2 | 80-85 | 60 | 100 | 65,000 |
| 508 | 60-5-30-5 | 80-85 | 60 | 100 | 65,000 |

[1] BMA—n-butyl methacrylate; IBMA—isobutyl methacrylate; MAc—methyl acrylate; DMI—dimethyl itaconate; MA—methacrylic acid.

In the foregoing examples the ratio of continuous aqueous phase to dispersed monomer is generally held at about 2.7 to 1 by volume. However this ratio of continuous external phase to dispersed monomer phase may vary widely from about 50/1 to about 3/2 by volume. For commercial runs ratios from about 4/1 to about 2 to 1 are preferred whereas in small scale runs ratios such as 8/1 may be used.

Portionwise addition of monomer can be used as well as delayed addition of co-monomer in order to effect conservation of the carbohydrate dipersing agent.

In those cases where starch is not removed by a separate hydrolysis step, preferably enzymatic treatment of the neutral polymer, then precipitated polymer contains so little occluded starch that it does not give a positive starch iodine test with standard iodine-potassium iodide testing reagent. Yet this polymer molded to a colorless blank upon being immersed for several hours in boiling water develops a white haze. To prevent this white haze the polymer is purified by hydrolysis and in cast or coated form the polymer passes the boiling water test.

The temperature of polymerization is preferably at least about 85° C. since at this temperature value the polymerization reaction proceeds smoothly and exothermic heat of polymerization is easily controlled.

In polymerization procedures carried out in accordance with the invention the use of chelated iron salt promoter such as ferrous disodium ethylene diamine tetraacetate is particularly preferred due to the fact that it imparts no discoloration due to iron to the product. With other iron salts such as inorganic salts it is desirable to wash the polymer with iron-free water to remove traces of iron salts.

The invention is defined in the claims which follow.

We claim:
1. A method of producing a uniform low molecular weight solid polymer of an ester of the formula

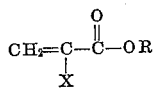

wherein X is a radical of the group consisting of $CH_3$— and —$COOR_1$ and R and $R_1$ are each a radical selected from the group consisting of alkyl, cycloalkyl, aralkyl, tetrahydrofurfuryl and tetrahydropyran-2-methyl comprising dispersing said ester of said formula in liquid droplet form in an aqueous acid solution having a pH of between about 1.5 and 6 containing as the sole dispersing agent for said monomer a hydrophilic carbohydrate in an amount of from about 0.2 to about 0.9% based on the weight of said monomer, said carbohydrate being selected from the group consisting of starch, gum tragacanth, agar agar, gum acacia, glycol cellulose and lower alkyl starch ethers to form liquid monomer droplets in which the average particle size of the suspended droplets is about 1-2 millimeters in diameter, adding a water-soluble iron salt as a promoter for peroxide polymerization to said solution, adding incrementally at a uniform rate to said solution an inorganic peroxide soluble in said acid medium which provides hydrogen peroxide as the polymerization catalyst in an amount of from 0.5% to about 3.5% of peroxide by weight of said monomer, this amount providing from about 0.001 to about 0.02% of hydrogen peroxide by weight of said aqueous acid solution, the ratio of said iron salt promoter to said peroxide being between about 1/300 mols to about 1/50 mols and heating the resulting mixture to a temperature of at least about 70° C. whereby solid polymer in a particle size range of about 2-20 microns precipitates from the aqueous acid solution, said temperature being above the decomposition temperature of said peroxide catalyst in said aqueous acid solution.

2. A method as claimed in claim 1 wherein X is the $COOR_1$ radical.

3. A method as claimed in claim 1 wherein said dispersing agent is starch.

4. A method of producing an aromatic solvent-soluble methacrylate alkyl ester solid polymer of uniform low molecular weight comprising dispersing methacrylate ester monomer in liquid droplet form in an aqueous acid solution having a pH of between about 1.5 and 6 containing as the sole agent for said monomer a hydrophilic carbohydrate in an amount of about 0.2% to about 0.9% based on the weight of said monomer, said carbohydrate being selected from the group consisting of starch, gum tragacanth, agar agar, gum acacia, glycol cellulose and lower alkyl starch ethers to form liquid monomer droplets in which the average particle size of the suspended droplets is about 1-2 millimeters in diameter, adding a water-soluble iron salt as a promoter for peroxide polymerization to said solution, adding to said aqueous acid solution an inorganic peroxide soluble in said acid medium which provides hydrogen peroxide as the polymerization catalyst in an amount from about 0.5% to about 3.5% of peroxide by weight of said monomer, said peroxide being added to said solution at a uniform rate during polymerization to provide from about 0.001% to about 0.02% by weight of peroxide as hydrogen peroxide in said acid medium throughout said polymerization the ratio of said iron salt promoter to said peroxide being between about 1/300 mols to about 1/50 mols, and heating the resulting mixture to a temperature of at least 70° C. whereby methacrylate alkyl ester solid polymer precipitates from the aqueous acid solution, said temperature being above the decomposition temperature of said peroxide catalyst in said aqueous acid solution.

5. A method of producing an aromatic solvent-soluble methacrylate alkyl ester solid polymer of uniform low molecular weight comprising dispersing methacrylate alkyl ester monomer in liquid droplet form in an aqueous acid solution having a pH of between about 1.5 and 6 containing as the sole dispersing agent for said monomer starch in an amount of about 0.2% to about 0.9% based on the weight of said monomer to form liquid monomer droplets in which the average particle size of the suspended droplets is about 1-2 millimeters in diameter, adding a water-soluble iron salt as a promoter for peroxide polymerization to said solution, adding hydrogen peroxide incrementally at a uniform rate throughout the polymerization cycle to said aqueous acid solution in an amount from about 0.5% to about 3.5% of peroxide by weight of said monomer, the ratio of said iron salt promoter to said peroxide being between about 1/300 mols to about 1/50 mols, and heating the resulting mixture to a temperature of at least 70° C. whereby methacrylate alkyl ester solid polymer precipitates from the aqueous acid solution, said temperature being above the decomposition temperature of said peroxide catalyst in said aqueous acid solution.

6. A method as claimed in claim 5 wherein the weight ratio of the aqueous solution phase to the monomer phase varies from about 50/1 to about 3/2.

7. A method as claimed in claim 5 wherein said starch is separated from precipitated finely divided methacrylate ester polymer by hydrolyzing the starch with amylase and washing the polymer with water to remove the product of hydrolysis.

8. A method as claimed in claim 5 wherein the molar ratio of said promoter to said peroxide is from about 1/100 to about 1/50 and wherein the temperature of polymerization is at least about 85° C.

9. A method as claimed in claim 5 wherein the monomer contains a hydroquinone inhibitor and wherein said polymer is recovered by filtration.

10. A method as claimed in claim 5 wherein said promoter is a ferric salt.

11. A method as claimed in claim 5 wherein said promoter is a ferrous salt.

12. A method as claimed in claim 11 wherein said ferrous salt is ferrous disodium salt of ethylene diamine tetraacetic acid.

13. A method of producing an aromatic solvent-soluble methacrylate alkyl ester solid polymer of uniform low molecular weight as claimed in claim 5 wherein said liquid methacrylate ester contains up to 5% of an aliphatic terminal monoethylenically unsaturated carboxylic acid selected from the group consisting of methacrylic acid, acrylic acid and itaconic acid.

14. A method of producing an aromatic solvent-soluble methacrylate ester of solid polymer of uniform low molecular weight as claimed in claim 5 wherein said liquid methacrylate alkyl ester contains up to 20% of styrene.

15. A method of producing an aromatic solvent-soluble methacrylate ester of solid polymer of uniform low molecular weight as claimed in claim 5 wherein said liquid methacrylate alkyl ester contains up to 10% of acrylonitrile.

16. A method of producing an aromatic solvent-soluble methacrylate ester solid polymer of uniform low molecular weight as claimed in claim 5 wherein said liquid methacrylate ester alkyl is a mixture of an alkyl methacrylate ester monomer and a crosslinking monomer selected from the group consisting of allyl methacrylate and glycidyl methacrylate in an amount up to 1% by weight of total monomer.

17. A method of producing an aromatic solvent-soluble methacrylate ester of solid polymer of uniform low molecular weight as claimed in claim 5 wherein said liquid methacrylate alkyl ester is a mixture of butyl methacrylate monomer and methyl methacrylate monomer.

References Cited in the file of this patent

UNITED STATES PATENTS

| | | |
|---|---|---|
| 2,473,929 | Wilson | June 21, 1949 |
| 2,875,185 | Wiley | Feb. 24, 1959 |

OTHER REFERENCES

Bovey et al.: "Emulsion Polymerization," vol. 9 of High Polymer Series, published 1955 by Interscience Publishers, pp. 71, 72, 74 and 81.